(12) United States Patent
Nishi et al.

(10) Patent No.: US 12,311,442 B2
(45) Date of Patent: May 27, 2025

(54) PROCESSING MACHINE

(71) Applicant: DMG MORI CO., LTD., Nara (JP)

(72) Inventors: Syuichi Nishi, Nara (JP); Yasumitsu Shiratsukayama, Nara (JP); Hisakazu Arita, Nara (JP)

(73) Assignee: DMG MORI CO., LTD., Nara (JP)

( * ) Notice: Subject to any disclaimer, the term of this patent is extended or adjusted under 35 U.S.C. 154(b) by 183 days.

(21) Appl. No.: 17/920,251

(22) PCT Filed: Apr. 24, 2020

(86) PCT No.: PCT/JP2020/017783
§ 371 (c)(1),
(2) Date: Dec. 24, 2022

(87) PCT Pub. No.: WO2021/215002
PCT Pub. Date: Oct. 28, 2021

(65) Prior Publication Data
US 2023/0158576 A1    May 25, 2023

(51) Int. Cl.
*B22F 12/80* (2021.01)
*B23K 26/08* (2014.01)
*B23Q 11/00* (2006.01)
*B23Q 11/08* (2006.01)
*B33Y 30/00* (2015.01)
*F16P 1/02* (2006.01)

(52) U.S. Cl.
CPC .......... *B22F 12/80* (2021.01); *B23K 26/0876* (2013.01); *B23Q 11/0078* (2013.01); *B23Q 11/0891* (2013.01); *B33Y 30/00* (2014.12); *F16P 1/02* (2013.01); *B23Q 11/0825* (2013.01)

(58) Field of Classification Search
CPC .......... B22F 12/80; B22F 10/25; B22F 12/53; B23K 26/0876; B23K 26/144; B23K 26/342; B23Q 11/0078; B23Q 11/0891; B23Q 11/0825; B33Y 30/00; B33Y 40/00; F16P 1/02
See application file for complete search history.

(56) References Cited

U.S. PATENT DOCUMENTS

| | | | |
|---|---|---|---|
| 2014/0014634 A1* | 1/2014 | Liu | B23K 26/362 219/121.68 |
| 2017/0057008 A1* | 3/2017 | Liu | G06T 7/0004 |
| 2018/0065224 A1 | 3/2018 | Nakamura et al. | |
| 2019/0118290 A1* | 4/2019 | Li | B23K 26/364 |
| 2021/0138598 A1 | 5/2021 | Horibe et al. | |

(Continued)

FOREIGN PATENT DOCUMENTS

| CN | 207983999 U | 10/2018 |
|---|---|---|
| CN | 209175403 U | 7/2019 |

(Continued)

*Primary Examiner* — Vinh Luong
(74) *Attorney, Agent, or Firm* — IP Business Solutions, LLC

(57) ABSTRACT

A processing machine includes: an external cover that forms an appearance of the processing machine and defines and forms an internal space; and a safety belt connection portion that is disposed in the internal space and to which a safety belt is connectable. The external cover includes an openable lid. The safety belt connection portion is exposed to an outside of the internal space through an opening that is generated in the external cover when the lid is in an open state.

12 Claims, 13 Drawing Sheets

(56) References Cited

U.S. PATENT DOCUMENTS

| | | | |
|---|---|---|---|
| 2023/0158574 A1* | 5/2023 | Otawa | B22F 12/50 |
| 2023/0158622 A1* | 5/2023 | Otawa | B23Q 11/08 |
| | | | 74/608 |
| 2023/0173568 A1* | 6/2023 | Nishi | B22F 10/25 |
| | | | 72/455 |
| 2024/0261866 A1* | 8/2024 | Otawa | B22F 10/25 |

FOREIGN PATENT DOCUMENTS

| | | | | |
|---|---|---|---|---|
| CN | 209503649 U | 10/2019 | | |
| JP | H07266184 A | 10/1995 | | |
| JP | 2012143854 A | 8/2012 | | |
| JP | 2017-189843 A | 10/2017 | | |
| JP | 2018034288 A | 3/2018 | | |
| JP | 2019069492 A | 5/2019 | | |
| JP | 6563622 B1 | 8/2019 | | |
| TW | M569264 U | 11/2018 | | |
| WO | WO 2020255961 A1 * | 12/2020 | ............ | B23B 25/04 |

\* cited by examiner

PROCESSING MACHINE

TECHNICAL FIELD

The present invention relates to a processing machine.

BACKGROUND ART

For example, Japanese Patent Laying-Open No. 2012-143854 (PTL 1) discloses a vertical lathe device including a turntable, a plurality of longitudinal frames erected on the turntable, a transverse frame connecting adjacent longitudinal frames, and a corridor that is fixed to an outer periphery of the longitudinal frame and allows a worker to move. A locking tool locking a safety rope connected to a safety belt wound around the worker is provided in the transverse frame.

CITATION LIST

Patent Literature

PTL 1: Japanese Patent Laying-Open No. 2012-143854

SUMMARY OF INVENTION

Technical Problem

A processing machine including a safety belt connection portion (locking tool) connecting the safety belt is known as disclosed in PTL 1 described above. The worker connects the safety belt attached to own body to the safety belt connection portion to ensure safety during working at a high place. However, depending on a position where the safety belt connection portion is provided, there is a possibility that it takes an excessive amount of time and effort when the worker uses the safety belt or the safety belt connection portion affects a maximum mechanical dimension of the processing machine.

An object of the present invention is to solve the above problems, and to provide a processing machine that has good workability when the worker uses the safety belt and is miniaturized.

Solution to Problem

A processing machine according to the present invention includes an external cover that forms an appearance of the processing machine and defines and forms an internal space, and a safety belt connection portion that is disposed in the internal space and to which a safety belt is connectable. The external cover includes an openable lid. The safety belt connection portion is exposed to an outside of the internal space through an opening that is generated in the external cover when the lid is in an open state.

According to the processing machine configured as described above, when performing an operation such as maintenance of the processing machine, the worker exposes the safety belt connection portion to the outside of the internal space through the opening by bringing the lid into the open state. As a result, the worker can connect the safety belt worn on own body to the safety belt connection portion, so that the workability can be improved when the worker uses the safety belt. In addition, the safety belt connection portion is disposed inside the external cover that forms the appearance of the processing machine, so that the safety belt connection portion is not disposed in the outermost shell of the processing machine. As a result, the processing machine can be downsized.

Preferably, the lid is disposed on a ceiling portion of the processing machine.

According to the processing machine configured as described above, the safety belt connection portion is disposed inside the external cover in the ceiling portion of the processing machine, so that the safety belt connection portion does not affect a maximum machine height of the processing machine.

Preferably, the lid is supported by the safety belt connection portion.

According to the processing machine configured as described above, a configuration in which the safety belt connection portion is exposed through the opening that is generated when the lid portion is in the open state can be easily obtained.

Preferably, the processing machine further includes a support that rotatably or slidably supports the lid. When the lid is rotated or slid, the opening is generated in the external cover.

According to the processing machine configured as described above, the lid can be easily opened and closed, so that the workability can be further improved when the worker uses the safety belt.

Preferably, the external cover includes a plurality of lids that is openable and closable independently of each other.

According to the processing machine configured as described above, the opening can be provided at an appropriate position by bringing at least one of the plurality of lids into the open state according to a work place in the processing machine.

Preferably, the safety belt connection portion includes a frame portion extending in one direction along an opening plane formed by the opening.

According to the processing machine configured as described above, the safety belt connection portion can be prevented from largely closing the opening plane of the opening. Thus, the worker can easily perform work such as maintenance of the processing machine through the opening.

Preferably, the safety belt connection portion further includes a rope routed along the frame portion.

According to the processing machine configured as described above, the worker can connect the safety belt mounted on own body to the rope.

Preferably, the frame portion is made of a pipe member having a closed section.

According to the processing machine configured as described above, the safety of the worker who uses the safety belt can be enhanced by sufficiently securing rigidity of the safety belt connection portion.

Preferably, the processing machine further includes: an additive-manufacturing head that is disposed in a processing area, discharges material powder to a workpiece, and irradiates the workpiece with a laser beam; a line body that extends from the additive-manufacturing head, is drawn from an inside to an outside of the processing area, and supplies the material powder and the laser beam to the additive-manufacturing head; and a line body support that is provided outside the processing area to support the line body. The line body support is exposed to the outside of the internal space through the opening that is generated in the external cover when the lid is in the open state.

According to the processing machine configured as described above, the worker can maintain the line body support through the opening generated in the external cover while connecting the safety belt mounted on own body to the safety belt connection portion.

Advantageous Effects of Invention

As described above, the processing machine that has the good workability when the operator uses the safety belt and is miniaturized can be provided according to the present invention.

DESCRIPTION OF EMBODIMENT

Figure 1:
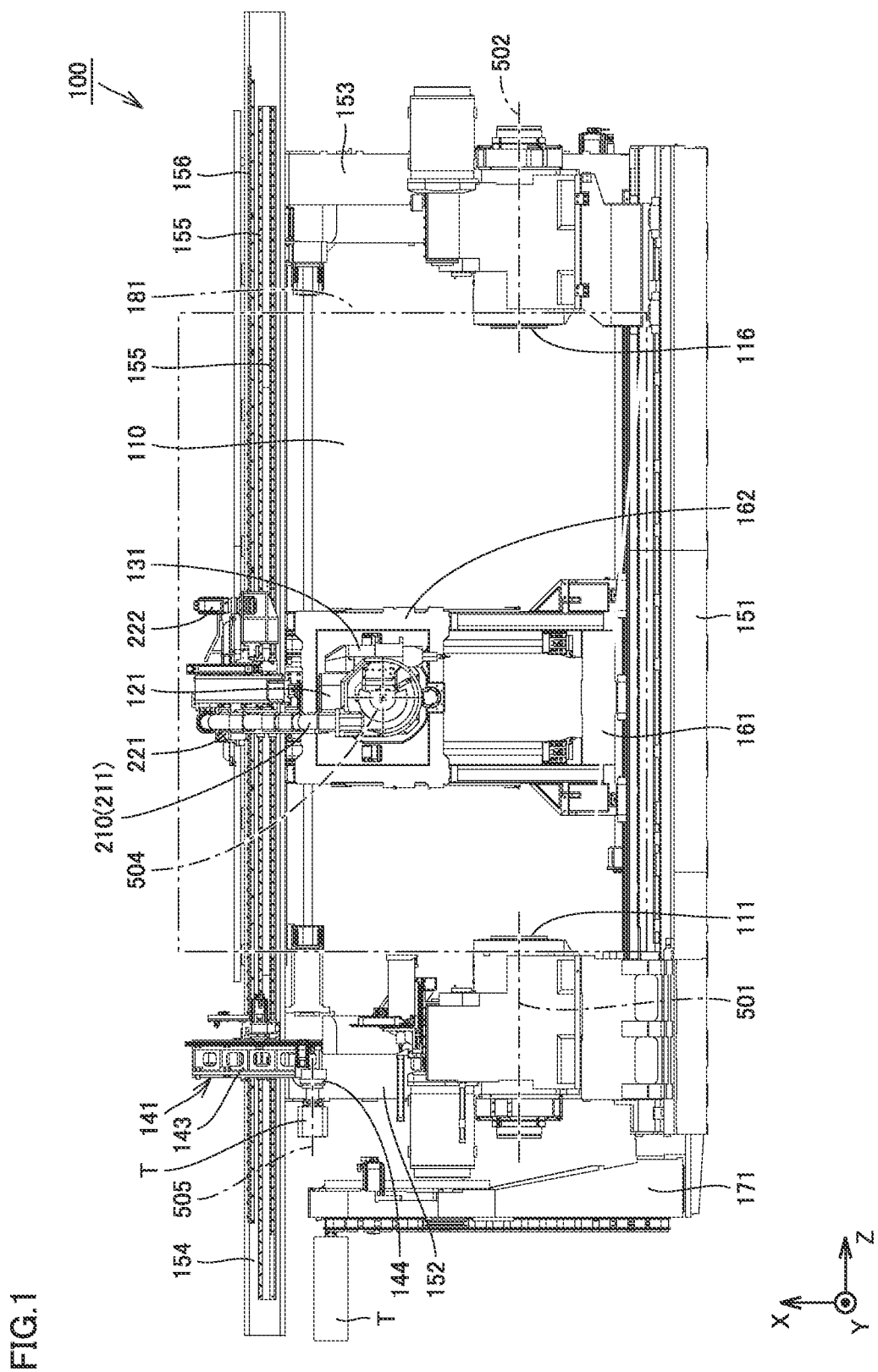
FIG. 1 is a front view illustrating a processing machine according to an embodiment of the present invention.

An embodiment of the present invention will be described with reference to the drawings. In the drawings referred to below, the same or corresponding member is denoted by the same reference numeral.

Figure 2:
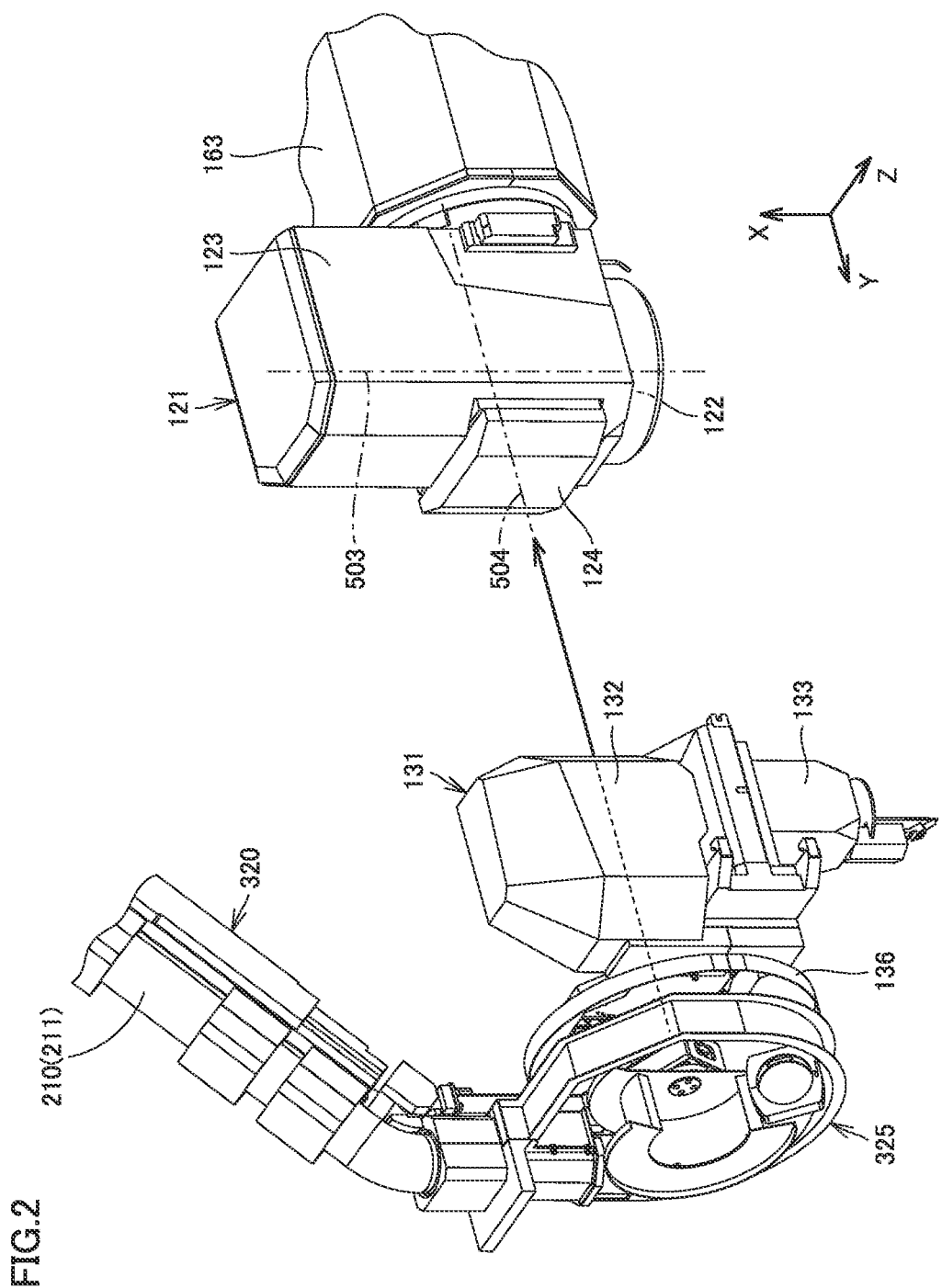
FIG. 2 is a perspective view illustrating attachment and detachment of a tool spindle and an additive-manufacturing head in the processing machine in FIG. 1.

FIG. 1 is a front view illustrating a processing machine according to an embodiment of the present invention. In FIG. 1, an inside of the processing machine is illustrated by seeing through a cover body having an appearance of the processing machine. FIG. 2 is a perspective view illustrating attachment and detachment of a tool spindle and an additive-manufacturing head in the processing machine in FIG. 1.

Referring to FIGS. 1 and 2, a processing machine 100 is an AM/SM hybrid processing machine capable of performing additive manufacturing (AM) processing for a workpiece and subtractive manufacturing (SM) processing for a workpiece. Processing machine 100 has a turning function using a stationary tool and a milling function using a rotating tool as a function of SM processing.

Processing machine 100 is a numerically control (NC) processing machine in which various operations for workpiece processing are automated by numerical control of a computer.

In the present specification, an axis parallel to a left-right direction (width direction) of processing machine 100 and extending in a horizontal direction is referred to as a "Z-axis", an axis parallel to a front-rear direction (depth direction) of processing machine 100 and extending in the horizontal direction is referred to as a "Y-axis", and an axis extending in a vertical direction is referred to as an "X-axis". A right direction in FIG. 1 is referred to as "+Z-axis direction", and a left direction is referred to as "−Z-axis direction". In FIG. 1, a front direction of a paper surface is referred to as a "+Y-axis direction", and a back direction is referred to as a "−Y-axis direction". In FIG. 1, an upward direction is referred to as a "+X-axis direction", and a downward direction is referred to as a "−X-axis direction". The X-axis, the Y-axis, and the Z-axis are three axes orthogonal to each other.

First, an overall structure of processing machine 100 will be described. Processing machine 100 includes a splash guard 181. Splash guard 181 defines and forms a processing area 110 where the workpiece is processed.

Processing machine 100 further includes a bed 151, a first workpiece spindle 111, a second workpiece spindle 116, and a tool rest (not illustrated).

Bed 151 is a base member supporting first workpiece spindle 111, second workpiece spindle 116, the tool rest, and the like, and is installed on a floor of a factory or the like.

First workpiece spindle 111 and second workpiece spindle 116 are disposed opposite to each other in the Z-axis direction. First workpiece spindle 111 and second workpiece spindle 116 are configured to be able to hold the workpiece. A chuck mechanism (not illustrated) detachably holding the workpiece is provided in first workpiece spindle 111 and second workpiece spindle 116. First workpiece spindle 111 mainly rotates the held workpiece about a rotation axis 501 parallel to the Z-axis during turning of the workpiece using a fixed tool. Second workpiece spindle 116 mainly rotates the held workpiece about a rotation axis 502 parallel to the Z-axis during the turning of the workpiece using the fixed tool.

First workpiece spindle 111 is fixed to bed 151. Second workpiece spindle 116 is provided to be movable in the Z-axis direction by various feed mechanisms, guide mechanisms, servomotors, and the like. Second workpiece spindle 116 may be configured to be fixed to bed 151. A tailstock supporting the rotation center of the workpiece held by first workpiece spindle 111 may be provided instead of second workpiece spindle 116.

The tool rest (not illustrated) is provided in processing area 110. The tool rest is configured to be able to hold a plurality of fixing tools for workpiece subtractive manufacturing (turning). The tool rest is supported by bed 151 with a saddle or the like (not illustrated) interposed therebetween. The tool rest is provided movably in the X-axis direction and the Z-axis direction by various feed mechanisms, guide mechanisms, servomotors, and the like provided in the saddle or the like. The tool rest may have a milling function for rotating the rotating tool.

Processing machine 100 further includes a first longitudinal frame 152, a second longitudinal frame 153, a first transverse frame 154, and a second transverse frame 311 (see FIG. 3 described later).

First longitudinal frame 152 and second longitudinal frame 153 have a columnar shape in which the X-axis direction (vertical direction) is a longer direction. First longitudinal frame 152 and second longitudinal frame 153 are provided apart from each other in the Z-axis direction. Lower ends of first longitudinal frame 152 and second longitudinal frame 153 are connected to bed 151.

First transverse frame 154 and second transverse frame 311 have a beam shape in which the Z-axis direction (left-right direction) is the longer direction. First transverse frame 154 and second transverse frame 311 are made of a pipe member having a rectangular closed section.

First transverse frame 154 and second transverse frame 311 are provided apart from each other in the Y-axis direction. First transverse frame 154 is provided at a position shifted in the +Y-axis direction from second transverse frame 311. Both ends of first transverse frame 154 in the Z-axis direction are connected to upper ends of first longitudinal frame 152 and second longitudinal frame 153, respectively. Both ends of second transverse frame 311 in the Z-axis direction are connected to upper ends of first longitudinal frame 152 and second longitudinal frame 153, respectively.

First longitudinal frame 152, second longitudinal frame 153, first transverse frame 154, and second transverse frame 311 form a gate-shaped frame structure on bed 151.

Processing machine 100 further includes a saddle 161, a cross slide 162, and a ram 163.

Saddle 161 is supported by bed 151. Saddle 161 is provided on bed 151 and between first longitudinal frame 152 and second longitudinal frame 153 in the Z-axis direction. Saddle 161 has a shape rising upward from bed 151 toward first transverse frame 154 and second transverse frame 311. Saddle 161 is provided to be movable in the Z-axis direction by various feed mechanisms, guide mechanisms, servomotors, and the like provided on bed 151 and the like.

Cross slide 162 is supported by saddle 161. Cross slide 162 has a flat plate shape parallel to the X-axis-Z-axis plane as a whole. Cross slide 162 is attached to a front surface of saddle 161 facing the +Y-axis direction. Cross slide 162 is provided to be movable in the X-axis direction (vertical direction) by various feed mechanisms, guide mechanisms, servomotors, and the like provided on saddle 161 and the like.

Ram 163 is supported by cross slide 162. Ram 163 has a cylindrical shape extending along the Y-axis direction as a whole. Ram 163 is provided so as to penetrate cross slide 162 and to protrude into processing area 110 in the Y-axis direction. Ram 163 is provided movably in the Y-axis direction by various feed mechanisms, guide mechanisms, servomotors, and the like provided on cross slide 162 and the like.

Processing machine 100 further includes a tool spindle 121. Tool spindle 121 is provided in processing area 110. Tool spindle 121 is configured to be able to hold the rotating tool for workpiece subtractive manufacturing (milling). Tool spindle 121 is provided with a clamp mechanism (not illustrated) detachably holding the rotating tool. Tool spindle 121 rotates the held rotating tool about a rotation axis 503 parallel to the X-axis-Z-axis plane during the milling of the workpiece using the rotating tool.

Tool spindle 121 is supported by ram 163. Tool spindle 121 is connected to a tip of ram 163 in the +Y-axis direction. Tool spindle 121 is three-dimensionally movable in processing area 110 by the movement of saddle 161 in the Z-axis direction, the movement of cross slide 162 in the X-axis direction, and the movement of ram 163 in the Y-axis direction.

Tool spindle 121 is further provided so as to be turnable about a turning axis 504 parallel to the Y-axis (B-axis turning). A turning range of tool spindle 121 is preferably within a range greater than or equal to ±90° with respect to a reference posture (posture in FIGS. 1 and 2) in which a spindle end face 122 of tool spindle 121 faces downward. As an example, the turning range of tool spindle 121 is a range of ±120° with respect to the reference posture.

Processing machine 100 further includes an automatic tool changer (ATC) 141 and a tool magazine 171.

Tool magazine 171 accommodates a plurality of rotating tools T used for milling the workpiece. Tool magazine 171 is provided outside processing area 110. Tool magazine 171 is provided on the opposite side of processing area 110 across first workpiece spindle 111 (first longitudinal frame 152). First workpiece spindle 111 (first longitudinal frame 152) is disposed between tool magazine 171 and processing area 110 in the Z-axis direction.

Automatic tool changer 141 is configured to be able to exchange tools between tool spindle 121 in processing area 110 and tool magazine 171 outside processing area 110.

Automatic tool changer 141 is supported by first transverse frame 154. Automatic tool changer 141 is movable in the Z-axis direction by various feed mechanisms, guide mechanisms, servomotors, and the like provided on first transverse frame 154 and the like.

More specifically, a rack 156 and a rail 155 are provided in first transverse frame 154. Rack 156 and rail 155 extend in the Z-axis direction. The range in which rack 156 and rail 155 extend in the Z-axis direction includes the range of processing area 110 in the Z-axis direction. A pinion (not illustrated) that engages with rack 156 is provided in automatic tool changer 141. A slider (not illustrated) slidable in the Z-axis direction while being engaged with rail 155 is provided in automatic tool changer 141.

When the pinion receiving the rotation from the servo motor rotates in the forward direction or the reverse direction, automatic tool changer 141 moves in the +Z-axis direction or the −Z-axis direction. Automatic tool changer 141 is movable between the inside and the outside of processing area 110.

Automatic tool changer 141 is movable between a standby position (position of automatic tool changer 141 in FIG. 1) that is located outside processing area 110 and above first workpiece spindle 111 and at which automatic tool changer 141 waits, an internal-side tool changing position that is located inside processing area 110 and at an arbitrary coordinate in the Z-axis direction and at which automatic tool changer 141 performs tool change with tool spindle 121, and a magazine-side tool changing position that is located outside processing area 110 and on an opposite side of the internal-side tool changing position with the standby position interposed therebetween and at which automatic tool changer 141 performs tool replacement with tool magazine 171.

Automatic tool changer 141 includes a lifting arm 143 and a double arm 144. Lifting arm 143 extends in an arm shape such that the X-axis direction (vertical direction) is the longer direction. Lifting arm 143 can lift and lower in the X-axis direction.

Double arm 144 extends in an arm shape, and includes gripping portions capable of gripping tools at both ends thereof. The double arm 144 is turnable about a turning axis 505 parallel to the Z-axis and is slidable in the axial direction of turning axis 505. Automatic tool changer 141 performs tool replacement by lifting and lowering lifting arm 143 and turning and sliding double arm 144 at each of the internal-side tool changing position and the magazine-side tool changing position.

Processing machine 100 further includes additive-manufacturing head 131. Additive-manufacturing head 131 performs additive manufacturing (directed energy deposition) by ejecting the material powder and irradiating the workpiece with laser beam. Metal powder such as stainless steel, Stellite, Inconel, or titanium can be used as the material powder. The material powder is not limited to the metal powder.

Additive-manufacturing head 131 includes a head body 132 and a laser tool 133. The laser beam and the material powder are introduced into head body 132. Laser tool 133 emits the laser beam toward the workpiece and determines an irradiation region of the laser beam on the workpiece. The material powder introduced into additive-manufacturing head 131 is discharged toward the workpiece through a nozzle (not illustrated).

Processing machine 100 includes a plurality of laser tools 133. The plurality of laser tools 133 are different in the shape and/or a size of the irradiation region of the laser beam defined on the workpiece. Any one of the plurality of laser tools 133 is selectively mounted on head body 132 in accordance with a condition of the additive manufacturing to be executed.

Additive-manufacturing head 131 further includes a disk portion 136. Disk portion 136 has a disk shape in which a thickness direction is the Y-axis direction. Disk portion 136 is connected to head body 132. Disk portion 136 is provided at a position bent at a right angle from the front end portion of head body 132 in the +Y-axis direction. Tool spindle 121 includes a front surface portion 124 and a side surface portion 123. Front surface portion 124 faces the +Y-axis direction. Side surface portion 123 faces the +Z-axis direction in the reference posture of tool spindle 121.

Additive-manufacturing head 131 is detachably attached to tool spindle 121. Additive-manufacturing head 131 is mounted on tool spindle 121 such that head body 132 is opposite to side surface portion 123 and such that disk portion 136 is opposite to front surface portion 124.

Additive-manufacturing head 131 (disk portion 136) and the tool spindle (front surface portion 124) have a built-in clamp mechanism using spring force or the like. When additive-manufacturing head 131 is mounted on tool spindle 121, the clamp mechanism operates to connect additive-manufacturing head 131 to tool spindle 121. Additive-manufacturing head 131 is connected to tool spindle 121 to be integrally movable with tool spindle 121 in the X-axis direction, the Y-axis direction, and the Z-axis direction.

Figure 3:
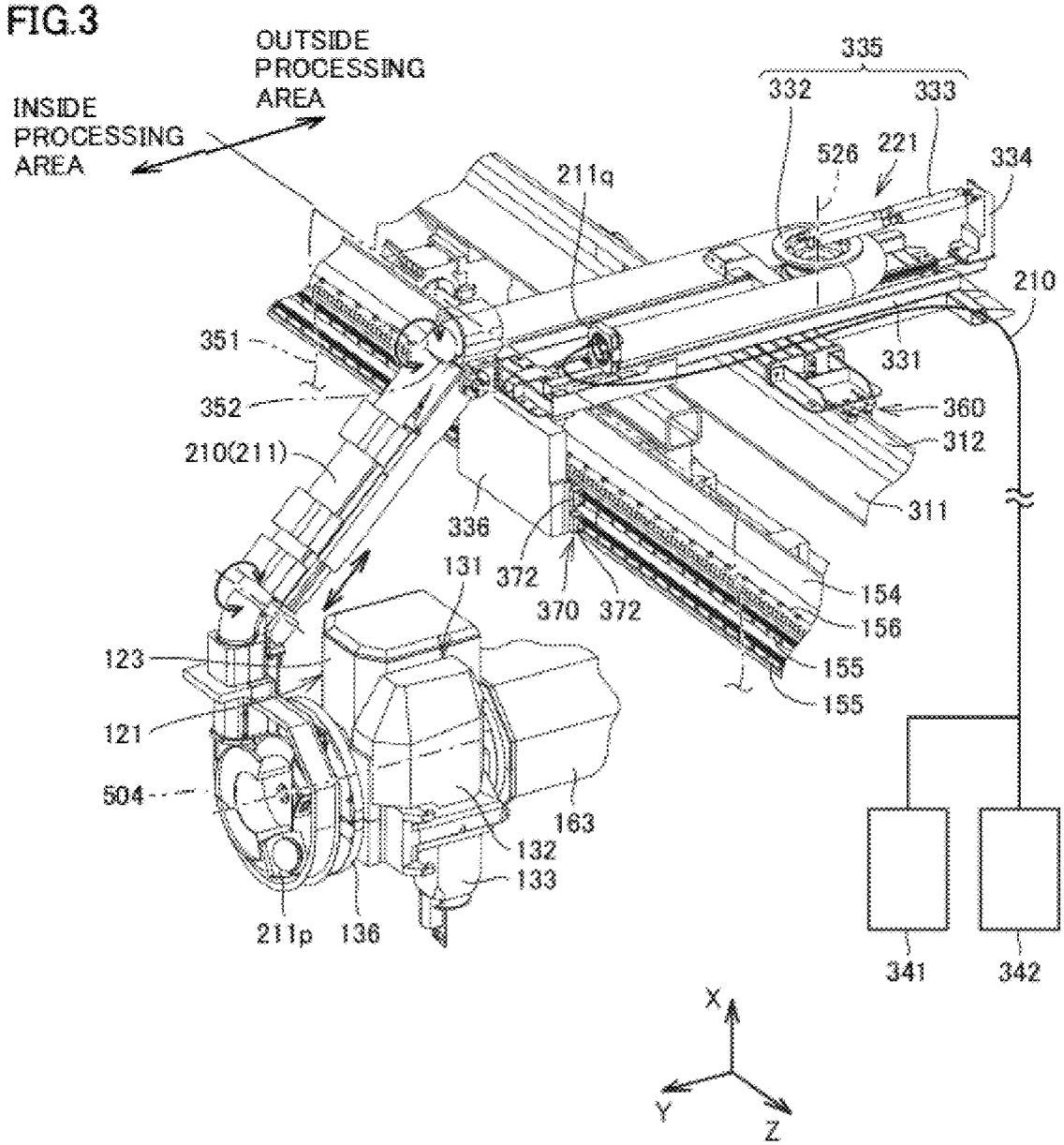
FIG. 3 is a perspective view illustrating a structure supplying a laser beam and a material powder to the additive-manufacturing head in FIG. 1.
Figure 4:
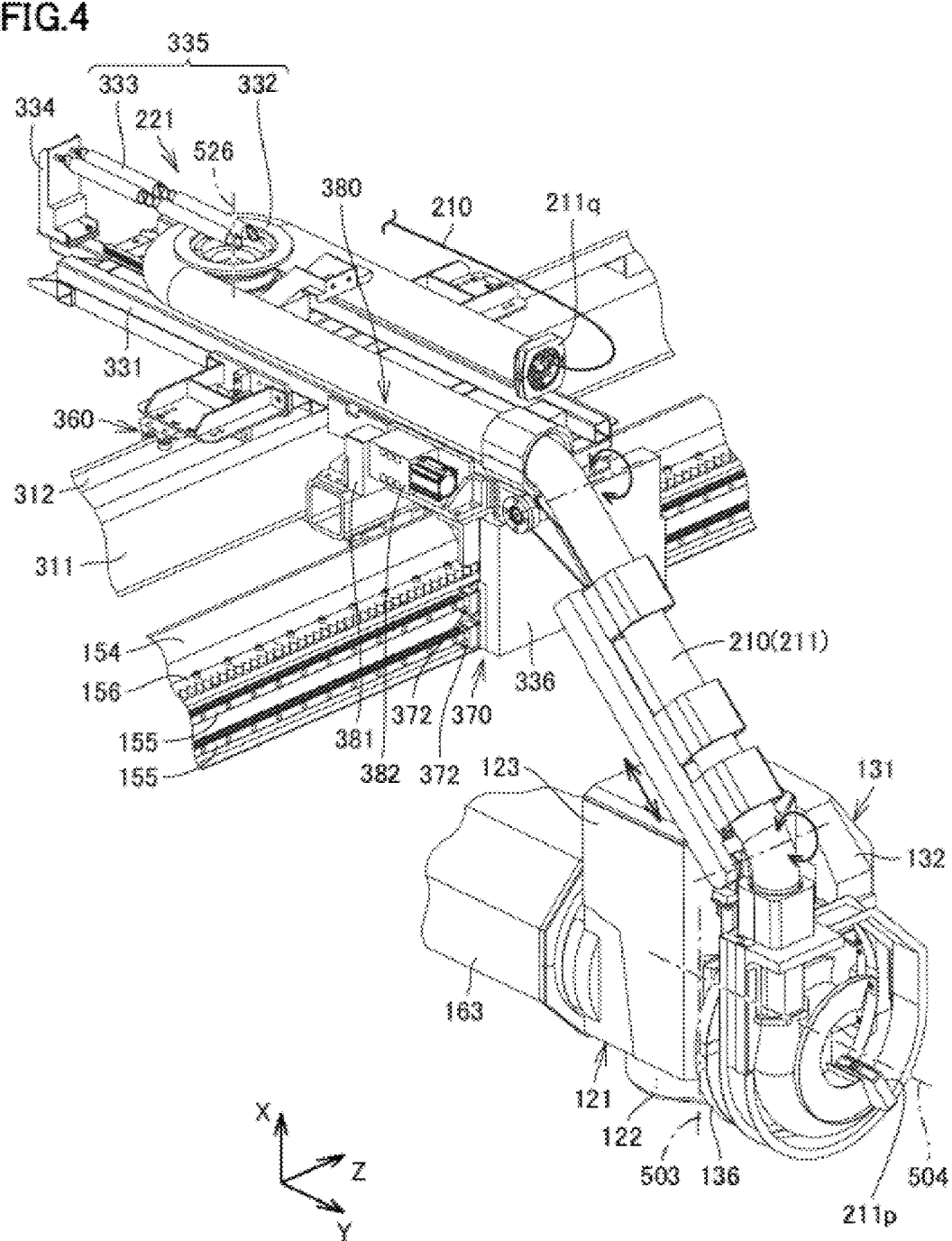
FIG. 4 is another perspective view illustrating the structure supplying the laser beam and the material powder to the additive-manufacturing head in FIG. 1.

FIGS. 3 and 4 are perspective views illustrating a structure supplying the laser beam and the material powder to the additive-manufacturing head in FIG. 1.

Referring to FIGS. 1 to 4, processing machine 100 further includes a material powder supply device 341, a laser oscillation device 342, and a line body 210.

Material powder supply device 341 and laser oscillation device 342 are installed outside processing area 110. Material powder supply device 341 feeds the material powder used for the additive manufacturing toward additive-manufacturing head 131. Laser oscillation device 342 oscillates the laser beam used for the additive manufacturing.

Line body 210 supplies the material powder from material powder supply device 341 to additive-manufacturing head 131, and supplies the laser beam from laser oscillation device 342 to additive-manufacturing head 131. Line body 210 extends from additive-manufacturing head 131. Line body 210 is drawn from the inside to the outside of processing area 110, and connected to material powder supply device 341 and laser oscillation device 342.

Line body 210 has flexibility, and can be bent and deformed when receiving external force. Line body 210 includes an optical fiber guiding the laser beam, a pipe guiding the material powder, an air pipe serving as a flow path of air, a gas pipe serving as a flow path of an inert gas, a cooling pipe serving as a flow path of a refrigerant, electric wiring, and a flexible tube 211 accommodating these.

Referring to FIGS. 3 and 4, splash guard 181 includes a slide cover 351.

As a whole, slide cover 351 has a flat plate shape parallel to the X-axis-Z-axis plane. Slide cover 351 is disposed on the back side of processing area 110 (the end of processing area 110 in the −Y-axis direction). Ram 163 penetrates slide cover 351 from the outside of processing area 110 and enters processing area 110 in the Y-axis direction. Slide cover 351 is slidably deformable in accordance with the movement of ram 163 in the X-axis direction and the Z-axis direction.

A line body insertion hole 352 is made in slide cover 351. Line body insertion hole 352 is a through-hole penetrating slide cover 351 in the Y-axis direction. Line body 210 (flexible tube 211) is inserted into line body insertion hole 352 from the inside of processing area 110 to be drawn out of processing area 110.

processing machine 100 further includes a line body support 221. Line body support 221 is provided outside processing area 110. Line body support 221 supports line body 210 drawn from processing area 110 outside processing area 110. Line body support 221 is provided above additive-manufacturing head 131. Line body support 221 is supported by first transverse frame 154 and second transverse frame 311.

Line body support 221 includes a base 331, a pulley portion 332, and a coil spring (elastic member) 333.

Base 331 is provided on first transverse frame 154 and second transverse frame 311. Base 331 is provided across first transverse frame 154 and second transverse frame 311 in top view. Line body 210 drawn from the inside to the outside of processing area 110 is routed on base 331. Line body 210 routed on base 331 is inserted into cable bear (registered trademark) (not illustrated) that can stroke in the Z-axis direction, and then extends toward material powder supply device 341 and laser oscillation device 342.

Pulley portion 332 is supported by base 331. Pulley portion 332 is provided so as to be rotatable about a rotation axis 526 parallel to the X-axis direction (vertical direction) and to be slidable in the Y-axis direction.

One end of coil spring 333 is connected to pulley portion 332. The other end of coil spring 333 is connected to base 331 with a bracket 334 interposed therebetween. Coil spring 333 applies elastic force in the −Y-axis direction to pulley portion 332. Coil spring 333 applies the elastic force in the direction away from processing area 110 in top view to pulley portion 332.

Flexible tube 211 is made of a flexible tube. Flexible tube 211 extends between the inside and the outside of processing area 110. One end 211p of flexible tube 211 is disposed inside processing area 110. The other end 211q of flexible tube 211 is disposed outside processing area 110.

Flexible tube 211 drawn from the inside to the outside of processing area 110 extends in the −Y-axis direction on base 331. Flexible tube 211 is wound around pulley portion 332, is inverted by 180°, and extends in the +Y-axis direction. The other end 211q of flexible tube 211 is fixed to base 331 at the tip of flexible tube 211 extending in the +Y-axis direction.

Pulley portion 332 and coil spring 333 constitute a tension applying mechanism 335. Tension applying mechanism 335 applies tension in the direction away from additive-manufacturing head 131 in processing area 110 to line body 210 (flexible tube 211). Tension applying mechanism 335 applies tensile force from the inside to the outside of processing area 110 to line body 210 (flexible tube 211).

According to such the configuration, deflection of line body 210 in processing area 110 can be prevented. When pulley portion 332 slides in the Y-axis direction, the length of line body 210 in processing area 111 can be automatically adjusted in accordance with the position of additive-manufacturing head 131.

The elastic member constituting tension applying mechanism 335 is not particularly limited, and for example, a gas spring may be used instead of coil spring 333.

Processing machine 100 further includes a first guide mechanism 370 and a second guide mechanism 360. First guide mechanism 370 and second guide mechanism 360 guide line body support 221 along the Z-axis direction. First guide mechanism 370 and second guide mechanism 360 are provided apart from each other in the Y-axis direction.

Line body support 221 further includes a block 336. Block 336 is fixed to base 331. Block 336 is opposite to first transverse frame 154 in the Y-axis direction.

First guide mechanism 370 includes rail 155 and a slider 372. First guide mechanism 370 includes two sets of rails 155 and sliders 372. Rail 155 is attached to first transverse frame 154. Rail 155 extends in the Z-axis direction. Slider 372 is attached to block 336. Slider 372 is engaged with rail 155 with a plurality of balls (not illustrated) interposed therebetween. Slider 372 and rail 155 constitute a linear guide mechanism in the Z-axis direction.

Second guide mechanism 360 is provided at a position away from first guide mechanism 370 in the −Y-axis direction. Second guide mechanism 360 includes a rail 312. Rail 312 is attached to second transverse frame 311. Rail 312 extends in the Z-axis direction. A pair of first rollers sandwiching rail 312 from both sides in the Y-axis direction and rotatable about a rotation axis parallel to the X-axis direction and a pair of second rollers sandwiching the rail 312 from both sides in the X-axis direction and rotatable about a rotation axis parallel to the Y-axis direction are attached to line body support 221 (base 331).

Referring to FIG. 4, processing machine 100 further includes a coupling mechanism 380. Coupling mechanism 380 includes an air cylinder 382 and a block 381.

Block 381 is attached to saddle 161. A pin insertion hole (not illustrated) is made in block 381. Air cylinder 382 is attached to line body support 221. Air cylinder 382 includes a pin (not illustrated) movable forward and backward in the Y-axis direction. A state in which tool spindle 121 and line body support 221 are coupled to each other is obtained when the pins of air cylinder 382 is inserted into the pin insertion holes made in block 381, and a state in which the coupling between tool spindle 121 and line body support 221 is released is obtained when the pins of air cylinder 382 is removed from the pin insertion holes made in block 381.

During the additive manufacturing for the workpiece, tool spindle 121 and line body support 221 are coupled by coupling mechanism 380, so that line body support 221 can be moved in the Z-axis direction integrally with tool spindle 121 and additive-manufacturing head 131. During the subtractive manufacturing for the workpiece, when the coupling between tool spindle 121 and line body support 221 by coupling mechanism 380 is released, line body support 221 and additive-manufacturing head 131 can be separated from tool spindle 121, and tool spindle 121 can be moved alone.

Line body support 221 is further configured to be movable in the Z-axis direction in a single state separated from tool spindle 121 (self-traveling mechanism).

More specifically, a rack 156 is provided in first transverse frame 154. Rack 156 extends in the Z-axis direction. A servomotor 222 (not illustrated in FIGS. 3 and 4, see FIG. 1) and a pinion (not illustrated) connected to an output axis of servomotor 222 and engaged with rack 156 are provided in line body support 221. While the coupling between tool spindle 121 and line body support 221 by coupling mechanism 380 is released, the pinion receiving the rotation from servomotor 222 rotates in a forward direction or a reverse direction, so that line body support 221 moves in the +Z-axis direction or the −Z-axis direction.

Figure 5:
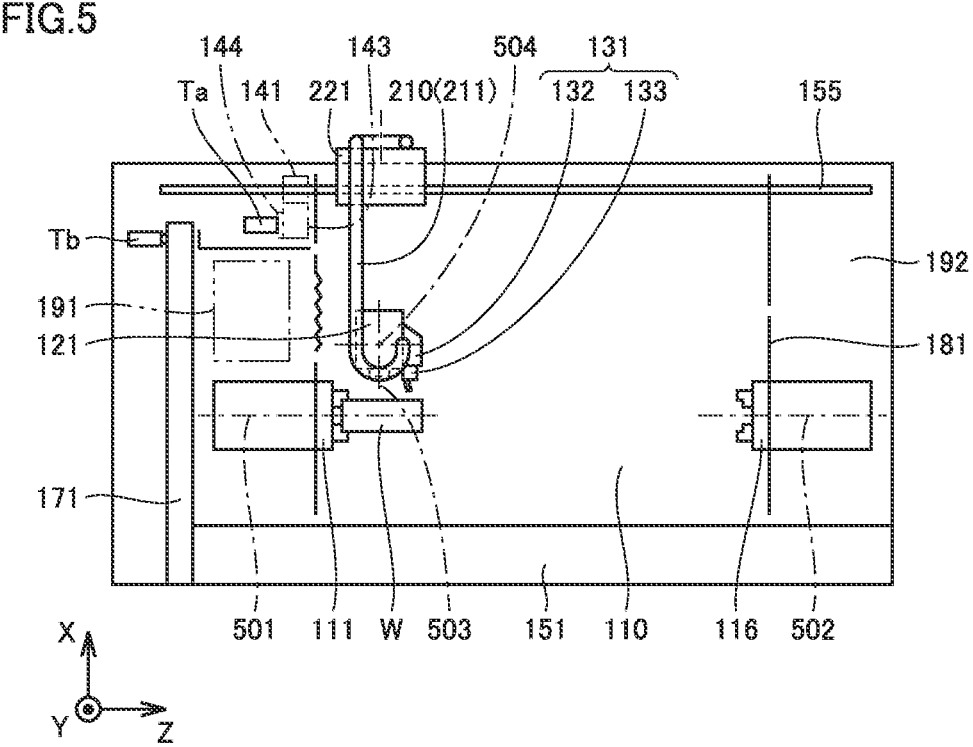
FIG. 5 is a front view schematically illustrating a first process of a processing flow of a workpiece in the processing machine in FIG. 1.
Figure 6:
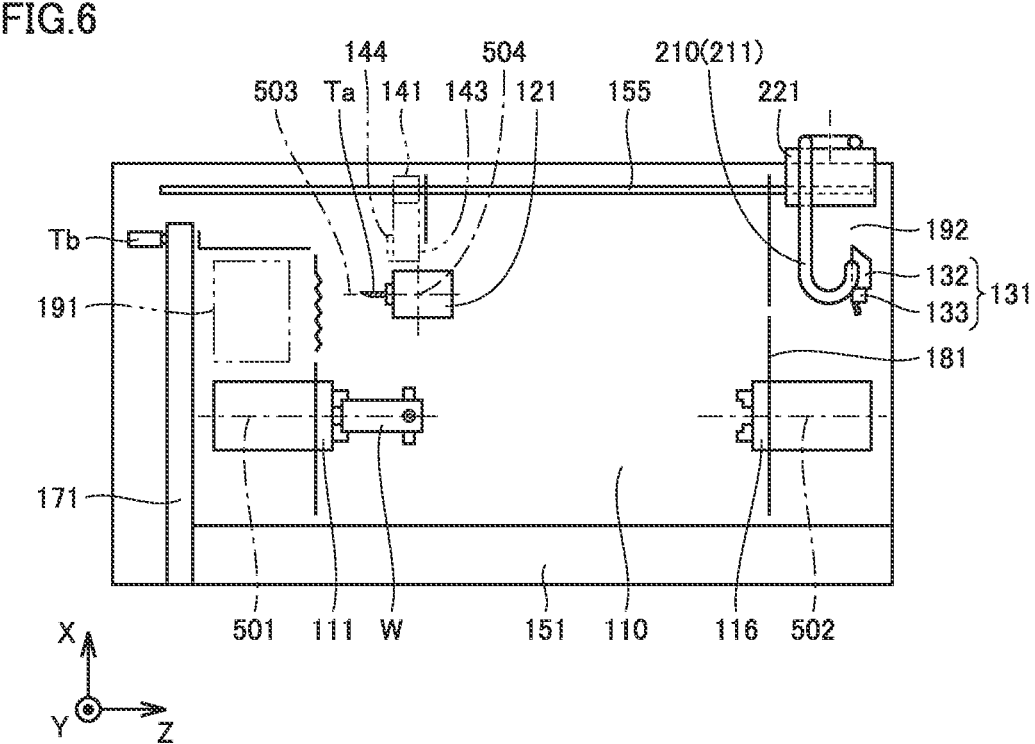
FIG. 6 is a front view schematically illustrating a second process of the processing flow of the workpiece in the processing machine in FIG. 1.
Figure 7:
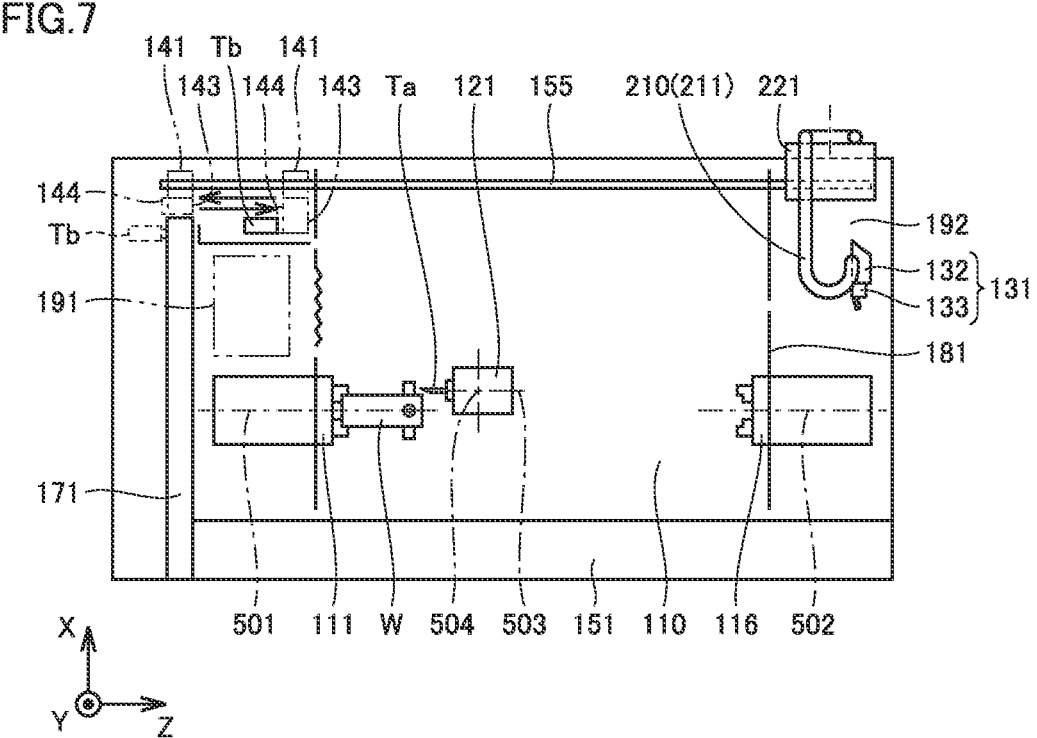
FIG. 7 is a front view schematically illustrating a third process of the processing flow of the workpiece in the processing machine in FIG. 1.

FIGS. 5 to 7 are front views schematically illustrating a processing flow of the workpiece in the processing machine in FIG. 1.

Referring to FIGS. 5 to 7, processing machine 100 further includes a laser tool storage portion 191 and a head storage portion 192. Laser tool storage portion 191 is configured to be able to store a plurality of laser tools 133. Head storage portion 192 is configured to be able to store additive-manufacturing head 131 separated from tool spindle 121 during subtractive manufacturing for the workpiece.

Laser tool storage portion 191 and head storage portion 192 are provided outside processing area 110. Laser tool storage portion 191 is provided between first workpiece spindle 111 and the standby position of automatic tool changer 141 in the X-axis direction (vertical direction). Head storage portion 192 is provided above second workpiece spindle 116.

As illustrated in FIG. 5, during the additive manufacturing for a workpiece W, additive-manufacturing head 131 is mounted on tool spindle 121. When tool spindle 121 moves in the X-axis direction, the Y-axis direction, and the Z-axis direction, additive-manufacturing head 131 also moves in processing area 110 integrally with tool spindle 121. Thus, the processing position of the additive manufacturing by additive-manufacturing head 131 is three-dimensionally displaced. Furthermore, when tool spindle 121 turns about turning axis 504, additive-manufacturing head 131 also turns about turning axis 504 integrally with tool spindle 121. Thus, the direction of the additive manufacturing by additive-manufacturing head 131 (the irradiation direction of the laser beam with respect to the workpiece) can be freely changed.

When additive-manufacturing head 131 is moved to the position opposite to laser tool storage portion 191 in the Z-axis direction, laser tool 133 mounted on additive-manufacturing head 131 can be replaced with another laser tool 133 stored in the laser tool storage portion 191.

As illustrated in FIG. 6, when the subtractive manufacturing for workpiece W is performed subsequent to the additive manufacturing for workpiece W, the connection between tool spindle 121 and additive-manufacturing head 131 is released, and the connection between line body support 221 and saddle 161 is also released. Additive-manufacturing head 131 integrated with line body support 221 is moved from the inside of processing area 110 to head storage portion 192 outside processing area 110 by the self-traveling mechanism provided in line body support 221.

On the other hand, tool spindle 121 from which additive-manufacturing head 131 is separated is turned by 90° about turning axis 504 from the reference posture. Automatic tool changer 141 is moved from the standby position to the internal-side tool changing position in processing area 110. A tool Ta gripped by automatic tool changer 141 is mounted on tool spindle 121 by automatic tool changer 141. When automatic tool changer 141 is moved from the internal-side tool changing position to the standby position, the mounting of the tool to tool spindle 121 is completed.

The internal-side tool changing position is appropriately set such that a movement amount of tool spindle 121 from the position of tool spindle 121 to the internal-side tool changing position at the start of tool change is shortened. The internal-side tool changing position set in this way may be selected from any coordinate in the Z-axis direction, or selected from a plurality of coordinate candidates in the Z-axis direction.

As illustrated in FIG. 7, during the subtractive manufacturing for workpiece W, the workpiece is milled by tool Ta held by tool spindle 121 while additive-manufacturing head 131 is stored in head storage portion 192.

During this time, automatic tool changer 141 is moved from the standby position to the magazine-side tool changing position, and tool Tb stored in tool magazine 171 at the magazine-side tool changing position is moved to automatic tool changer 141. Automatic tool changer 141 holding tool Tb is moved from the magazine-side tool changing position to the standby position to prepare for the next tool change in tool spindle 121.

A safety belt connection portion 750 used during maintenance of processing machine 100 and a cover structure around safety belt connection portion 750 will be described below.

Figure 8:
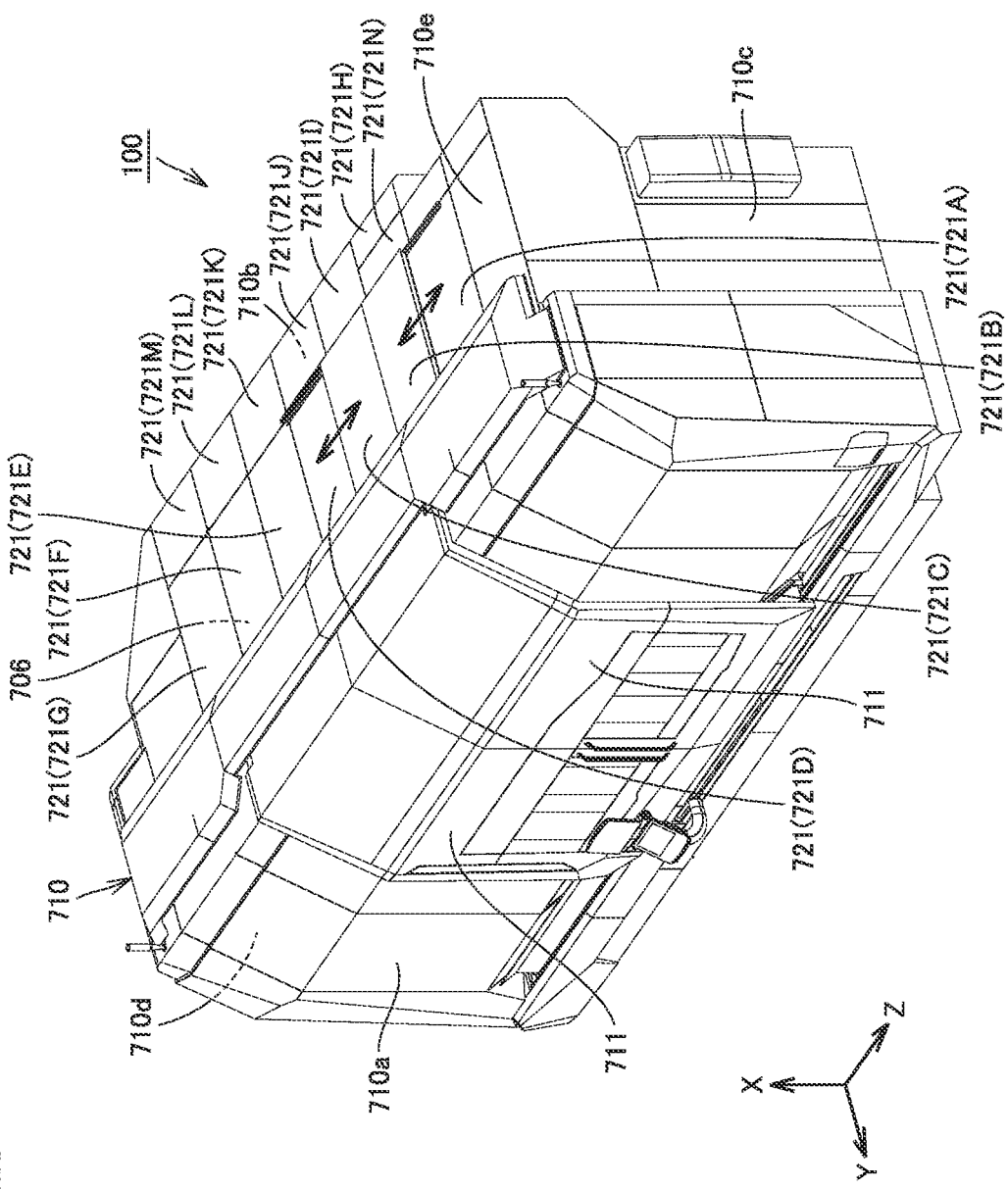
FIG. 8 is a perspective view illustrating an appearance of the processing machine.
Figure 9:
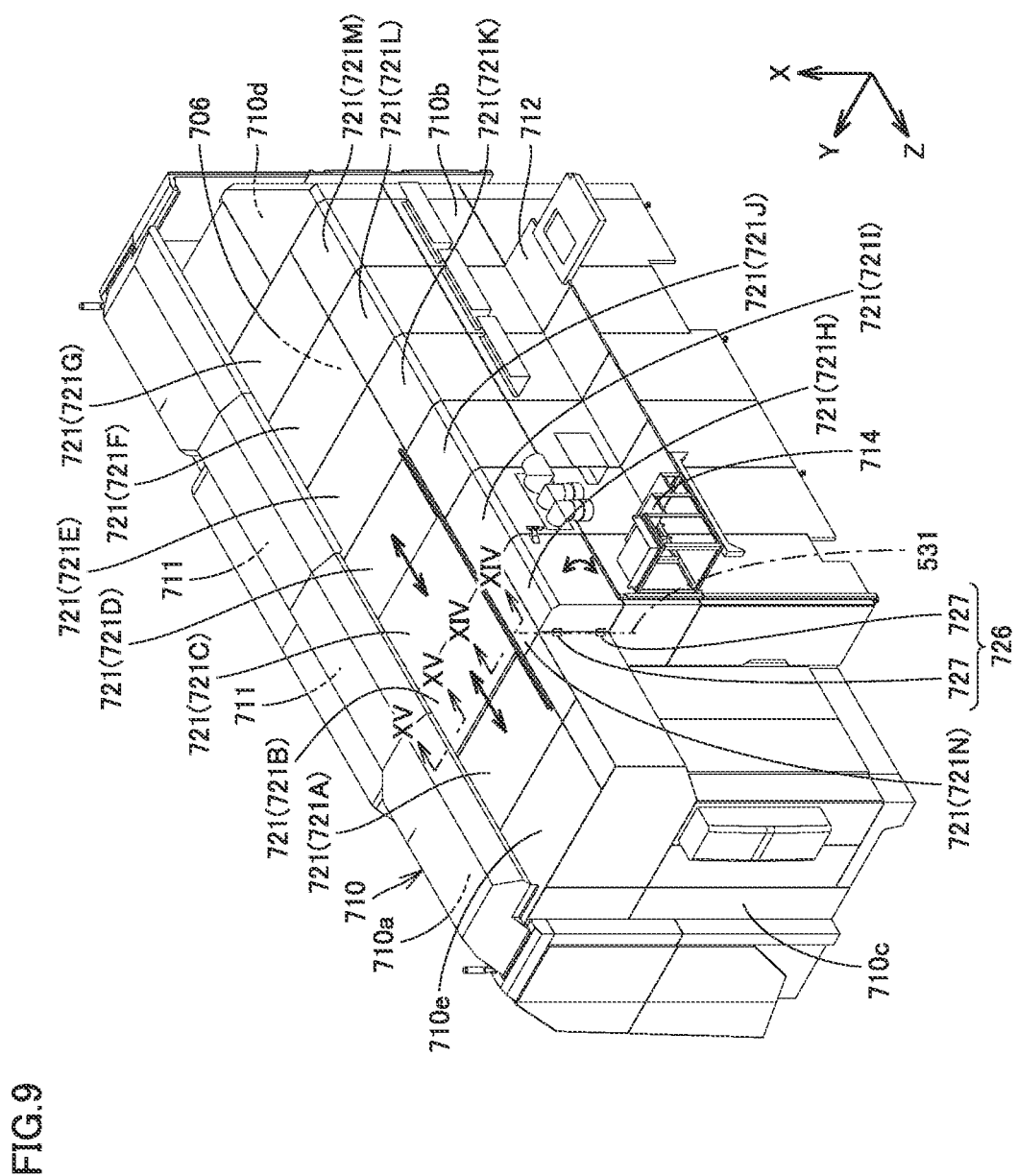
FIG. 9 is another perspective view illustrating the appearance of the processing machine.

FIGS. 8 and 9 are perspective views illustrating an appearance of the processing machine. FIG. 8 illustrates a front surface side of processing machine 100, and FIG. 9 illustrates a rear surface side of processing machine 100. Referring to FIGS. 8 and 9, processing machine 100 further includes an external cover 710. external cover 710 has the appearance of processing machine 100. An internal space 706 is defined and formed inside external cover 710.

As a whole, external cover 710 has a box shape including a front surface 710a facing the +Y-axis direction, a rear surface 710b facing the −Y-axis direction, a right side surface 710c facing the +Z-axis direction, a left side surface 710d facing the −Z-axis direction, and an upper surface 710e facing the +X-axis direction (upward).

The relationship between splash guard 181 in FIG. 1 and external cover 710 will be described. Splash guard 181 is basically provided inside external cover 710. However, a door 711 that is provided on front surface 710a and opened and closed at the time of accessing the inside of processing area 110 constitutes both splash guard 181 that defines and forms processing area 110 when being closed and external cover 710 that forms the appearance of processing machine 100. Internal space 706 is separated from processing area 110 by splash guard 181.

Processing machine 100 further includes a corridor 712 and a ladder 714. Corridor 712 is configured to allow a worker to walk. Corridor 712 is provided at a position spaced upward from the floor surface on which processing machine 100 is mounted. Corridor 712 is provided on rear surface 710b. Corridor 712 extends in the −Y-axis direction from rear surface 710b and extends along the Z-axis direction. Ladder 714 is provided on corridor 712. Ladder 714 is configured such that the worker can ascend and descend between corridor 712 and a footboard 716 (see FIG. 10) described later.

External cover 710 includes an openable and closable lid 721. Lid 721 is disposed on a ceiling portion (upper surface 710e) of processing machine 100.

External cover 710 has a plurality of lids 721 (721A, 721B, 721C, 721D, 721E, 721F, 721G, 721H, 721I, 721J, 721K, 721L, 721M, 721N). Lids 721A, 721B, 721C, 721D, 721E, 721F, 721G, 721H, 721I, 721J, 721K, 721L, 721M, and 721N are configured to be openable and closable independently of each other.

Lids 721A, 721B, 721C, 721D, 721E, 721F, 721G are disposed on the upper surface 710e. Lids 721A, 721B, 721C, 721D, 721E, 721F, 721G are arranged in the—Z-axis direction in this order. Each of the lids 721A, 721B, 721C, 721D, 721E, 721F, 721G is made of a plate material parallel to the Y-axis-Z-axis plane.

Lids 721H, 721I, 721J, 721K, 721L, 721M are disposed at corner portions of upper surface 710e and rear surface 710b. Lids 721H, 721I, 721J, 721K, 721L, 721M are arranged in the −Z-axis direction in this order. Each of lid 721H and lid 721M is made of a plate material including three surfaces parallel to the Y-axis-Z-axis plane, the X-axis-Y-axis plane, and the X-axis-Z-axis plane. Each of lids 721I, 721J, 721K, 721L is made of a plate material including two surfaces parallel to the Y-axis-Z-axis plane and the X-axis-Z-axis plane.

Lids 721I, 721J, 721K, 721L, 721M are provided adjacent to lids 721C, 721D, 721E, 721F, 721G in the Y-axis direction, respectively.

Lid 721N is disposed on upper surface 710e. Lid 721N is provided adjacent to lid 721B in the Y-axis direction. Lid 721H is provided adjacent to lid 721N in the Y-axis direction. Lid 721N is located between lid 721B and lid 721H in the Y-axis direction. Lid 721N is made of a plate material parallel to the Y-axis-Z-axis plane.

Figure 10:
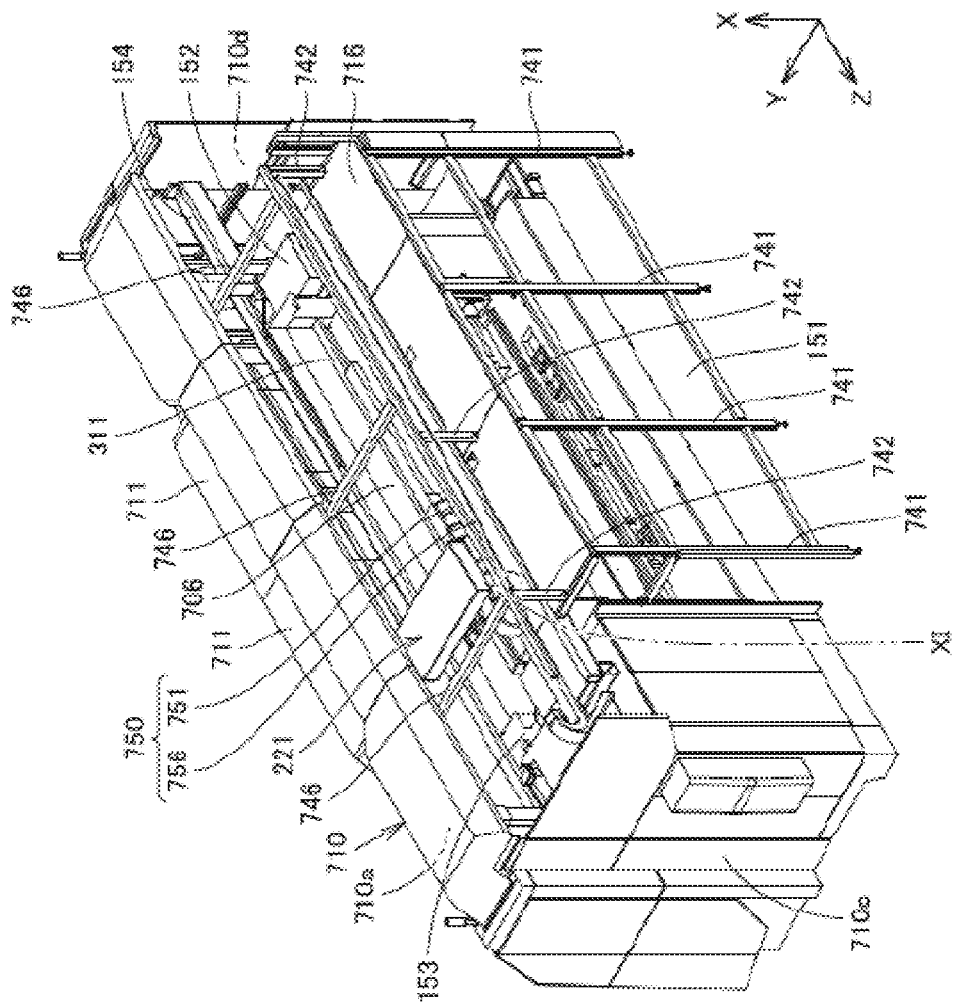
FIG. 10 is a perspective view illustrating a frame structure supporting an external cover in FIG. 9.

FIG. 10 is a perspective view illustrating a frame structure supporting the external cover in FIG. 9. In FIG. 10, external cover 710 on upper surface 710e and rear surface 710b is partially removed.

Referring to FIGS. 9 and 10, processing machine 100 further includes a plurality of first columns 741, a footboard 716, a plurality of second columns 742, a first beam (frame portion) 751, and a plurality of second beams 746. The plurality of first columns 741, the footboard 716, the plurality of second columns 742, the first beam 751, and the plurality of second beams 746 are disposed in internal space 706 inside external cover 710.

Footboard 716 is provided at a position away upward from the floor surface on which processing machine 100 is mounted. Footboard 716 is provided at a position shifted from corridor 712 in the +Y-axis direction and the +X-axis direction (upward). Footboard 716 is provided inside lids 721H, 721I, 721J, 721K, 721L, 721M, 721N. Footboard 716 is made of a plate material parallel to the Y-axis-Z-axis plane. Footboard 716 extends along the Z-axis direction.

The first column 741 has a column shape extending upward from the floor surface on which processing machine 100 is mounted. The plurality of first columns 741 are disposed at intervals in the Z-axis direction. Upper ends of the plurality of first columns 741 are connected to footboard 716. The plurality of first columns 741 support footboard 716.

First beam 751 is provided at a position separated upward from footboard 716. First beam 751 is opposite to footboard 716 in the X-axis direction. First beam 751 extends in the horizontal direction. First beam 751 has a beam shape extending along the Z-axis direction.

First beam 751 is made of the pipe member having the closed section. First beam 751 has a rectangular closed section when cut along a plane orthogonal to the Z-axis direction.

A length region of processing area 110 in the Z-axis direction is included in a length region of first beam 751 in the Z-axis direction. First beam 751 is provided above line body support 221. First beam 751 is provided at the position closer to rear surface 710b than front surface 710a of external cover 710 in the Y-axis direction. First beam 751 is provided at the position shifted in the -Y-axis direction from line body support 221. First beam 751 extends while overlapping on a straight line forming a boundary between the plurality of lids 721B, 721C, 721D, 721E, 721F, 721G and the plurality of lids 721N, 721I, 721J, 721K, 721L, 721M in top view.

Second beam 746 has a beam shape extending in the Y-axis direction. The plurality of second beams 746 are disposed at intervals in the Z-axis direction. An end (rear end) of second beam 746 in the -Y-axis direction is opposite to first beam 751.

The plurality of second columns 742 have a column shape extending upward from footboard 716. The plurality of second columns 742 are disposed at intervals in the Z-axis direction. Upper ends of the plurality of second columns 742 are connected to first beam 751 and the plurality of second beams 746. The plurality of second columns 742 support first beam 751 and the plurality of second beams 746.

Lids 721A, 721D, 721E, 721F, 721G, 721N, 721I, 721J, 721K, 721L, 721M are supported by first beam 751. End portions (rear end portions) of lids 721A, 721D, 721E, 721F, 721G in the -Y-axis direction are placed on first beam 751. Ends (front end portions) of lids 721N, 721I, 721J, 721K, 721L, 721M in the +Y-axis direction are placed on first beam 751 (see also FIG. 14 described later).

Figure 11:
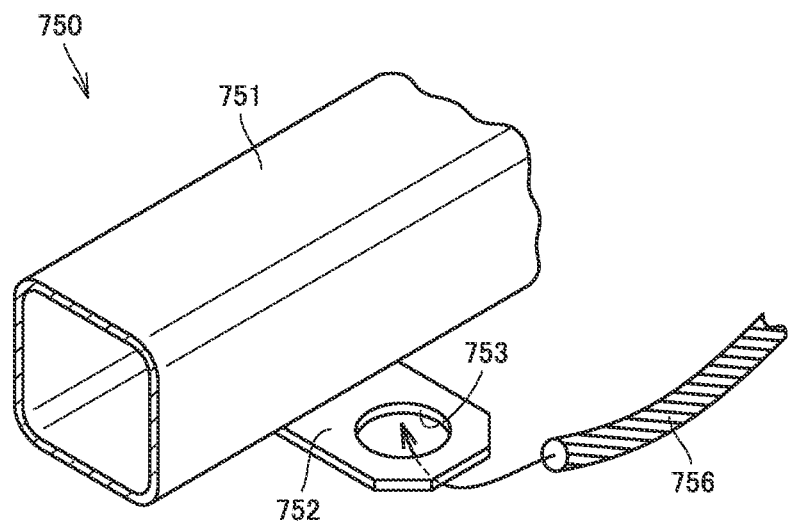
FIG. 11 is an exploded view illustrating a safety belt connection portion in a range surrounded by a two-dot chain line XI in FIG. 10.
Figure 12:
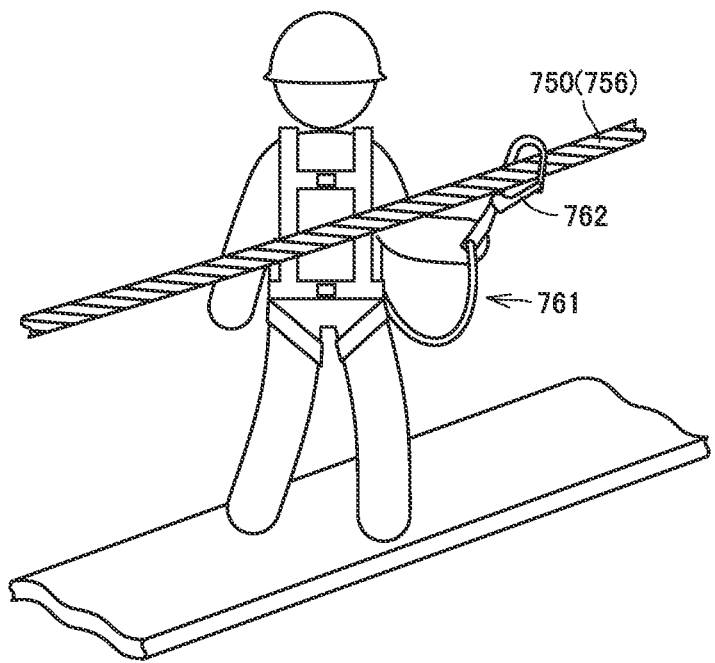
FIG. 12 is a view illustrating a method for using the safety belt connection portion in FIG. 10.

FIG. 11 is an exploded view illustrating a safety belt connection portion in a range surrounded by a two-dot chain line XI in FIG. 10. FIG. 12 is a view illustrating a method for using the safety belt connection portion in FIG. 10. Referring to FIGS. 10 to 12, processing machine 100 includes safety belt connection portion 750.

Safety belt connection portion 750 includes first beam 751 and a rope 756. Rope 756 is routed along first beam 751. Rope 756 extends in the Z-axis direction.

Rope 756 is fixed to first beam 751. A plurality of tabs 752 are attached to first beam 751. The plurality of tabs 752 are provided at positions away from each other in the Z-axis direction. A rope insertion hole 753 is made in tab 752. Both ends of rope 756 are fastened to tabs 752 while inserted into rope insertion hole 753.

A safety belt 761 is a protective tool that prevents the worker working at a high place from falling. Safety belt connection portion 750 is configured to be able to connect safety belt 761 worn by the worker.

More specifically, the worker hangs a hook 762 provided in safety belt 761 on rope 756 to connect safety belt 761 to safety belt connection portion 750. The worker can move along the Z-axis direction in which rope 756 extends while hanging hook 762 on rope 756.

In the embodiment, first beam 751 is made of the pipe member having the closed section, so that rigidity of safety belt connection portion 750 can be sufficiently increased.

The structure of safety belt connection portion 750 is not limited to the above configuration, but for example, rope 756 may not be fixed to first beam 751, and hook 762 of safety belt 761 may be directly hanged on first beam 751.

Figure 13:
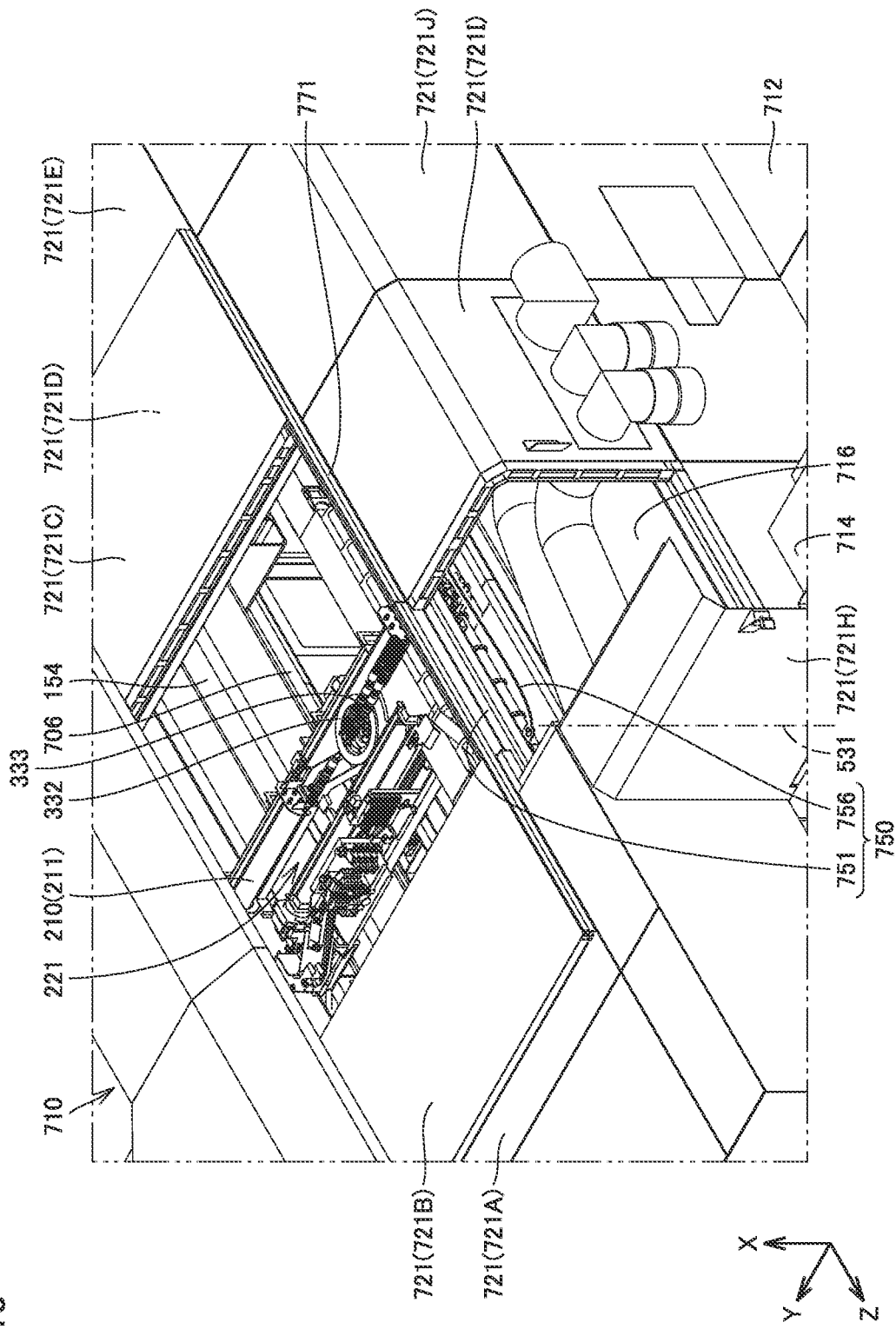
FIG. 13 is a perspective view illustrating the processing machine when a lid in FIG. 9 is in an open state.
Figure 14:
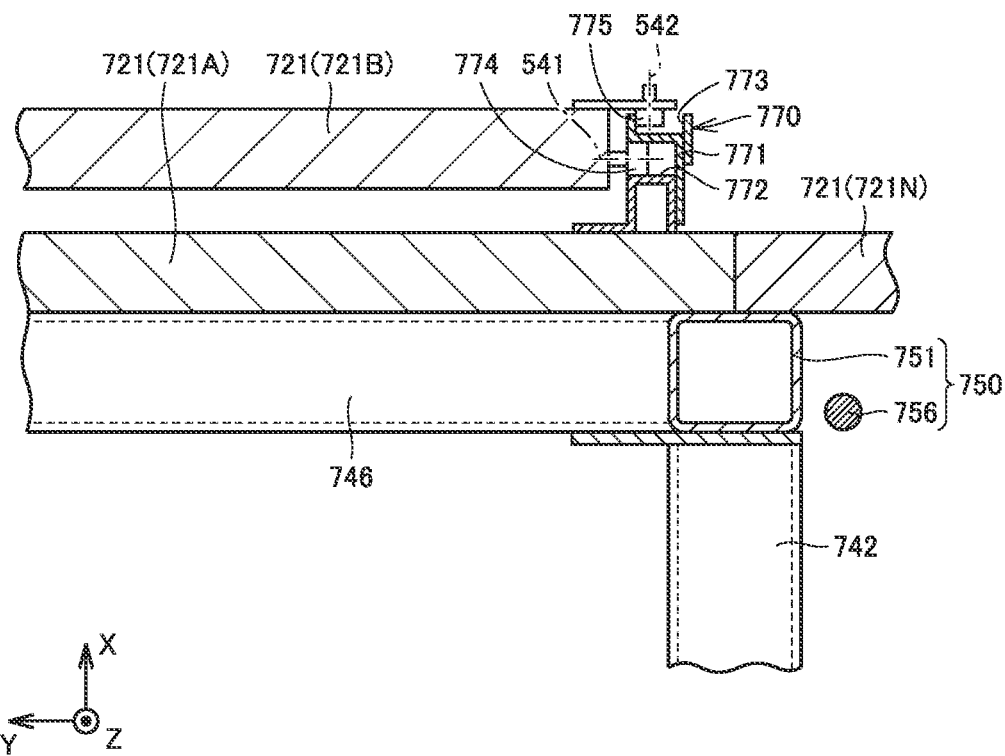
FIG. 14 is a sectional view illustrating the processing machine viewed in an arrow direction on a line XIV-XIV in FIG. 9.
Figure 15:
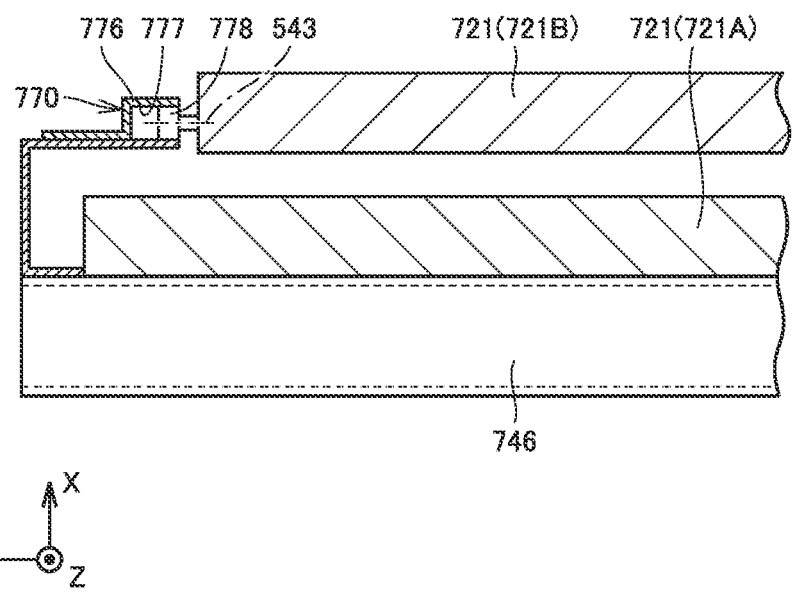
FIG. 15 is a sectional view illustrating the processing machine as viewed in an arrow direction on a line XV-XV in FIG. 9.

FIG. 13 is a perspective view illustrating the processing machine when the lid in FIG. 9 is in the open state. FIG. 14 is a sectional view illustrating the processing machine viewed in an arrow direction on a line XIV-XIV in FIG. 9. FIG. 15 is a sectional view illustrating the processing machine as viewed in an arrow direction on a line XV-XV in FIG. 9.

Referring to FIGS. 9 and 13 to 15, processing machine 100 further includes a first support 770. First support 770 slidably supports lid 721B and lid 721C. First support 770 supports lid 721B and lid 721C so as to be slidable in the Z-axis direction.

As illustrated in FIGS. 13 and 14, first support 770 includes a first rail 771, a first rotation roller 774, and a second rotation roller 775. An end (rear end) of lid 721A in the -Y-axis direction is supported by first rail 771, first rotation roller 774, and second rotation roller 775.

First rail 771 extends in the Z-axis direction between lid 721A and lid 721D. First rail 771 is supported by lid 721A and lid 721D. First rail 771 is provided with a first groove 772 and a second groove 773. First groove 772 opens toward the +Y-axis direction and extends in the Z-axis direction. Second groove 773 opens in the +X-axis direction (upward) and extends in the Z-axis direction.

First rotation roller 774 and second rotation roller 775 are attached to lid 721B. First rotation roller 774 is provided so as to be rotatable about a rotation axis 541 extending in the Y-axis direction. First rotation roller 774 is fitted in first groove 772. Second rotation roller 775 is provided so as to be rotatable about a rotation axis 542 extending in the X-axis direction. Second rotation roller 775 is fitted into second groove 773.

As illustrated in FIG. 15, first support 770 further includes a second rail 776 and a third rotation roller 778. An end (front end) of lid 721A in the +Y-axis direction is supported by second rail 776 and third rotation roller 778.

Second rail 776 extends in the Z-axis direction. A third groove 777 is provided in second rail 776. Third groove 777 opens in the -Y-axis direction and extends in the Z-axis direction. Third rotation roller 778 is provided so as to be rotatable about a rotation axis 543 extending in the Y-axis direction. Third rotation roller 778 is fitted into third groove 777.

With such the configuration, lid 721B can slide in the Z-axis direction. A plurality of rotation rollers corresponding to first rotation roller 774, second rotation roller 775, and third rotation roller 778 are also attached to lid 721C. Lid 721C is slidable in the Z-axis direction by a support structure similar to that of lid 721A.

As illustrated in FIGS. 9 and 13, in the closed states of lid 721B and lid 721C, lid 721B and lid 721C abut on each other in the Z-axis direction. Lid 721B is slid and moved in the +Z-axis direction to be positioned above lid 721A, and lid 721C is slid and moved in the -Z-axis direction to be positioned above lid 721D, whereby lid 721B and lid 721C are brought into the open state.

Referring to FIGS. 9 and 13, processing machine 100 further includes a second support 726. Second support 726 revolvably supports lid 721H. Second support 726 revolvably supports lid 721H about a rotation axis 531 parallel to the X-axis direction (vertical direction). For example, a plurality of hinges 727 is used for second support 726.

In the closed state of lid 721H, lid 721H is positioned so as to be aligned with lid 721I in the Z-axis direction. When lid 721H is revolved about rotation axis 531 and separated from lid 721I, lid 721H becomes the open state.

In the closed state of lid 721N, lid 721N is attached to external cover 710 and first beam 751 that are adjacent to lid 721N using a bolt (not illustrated). When the bolt is loosened to remove lid 721N from external cover 710 and first beam 751, lid 721N becomes the open state.

Figure 16:
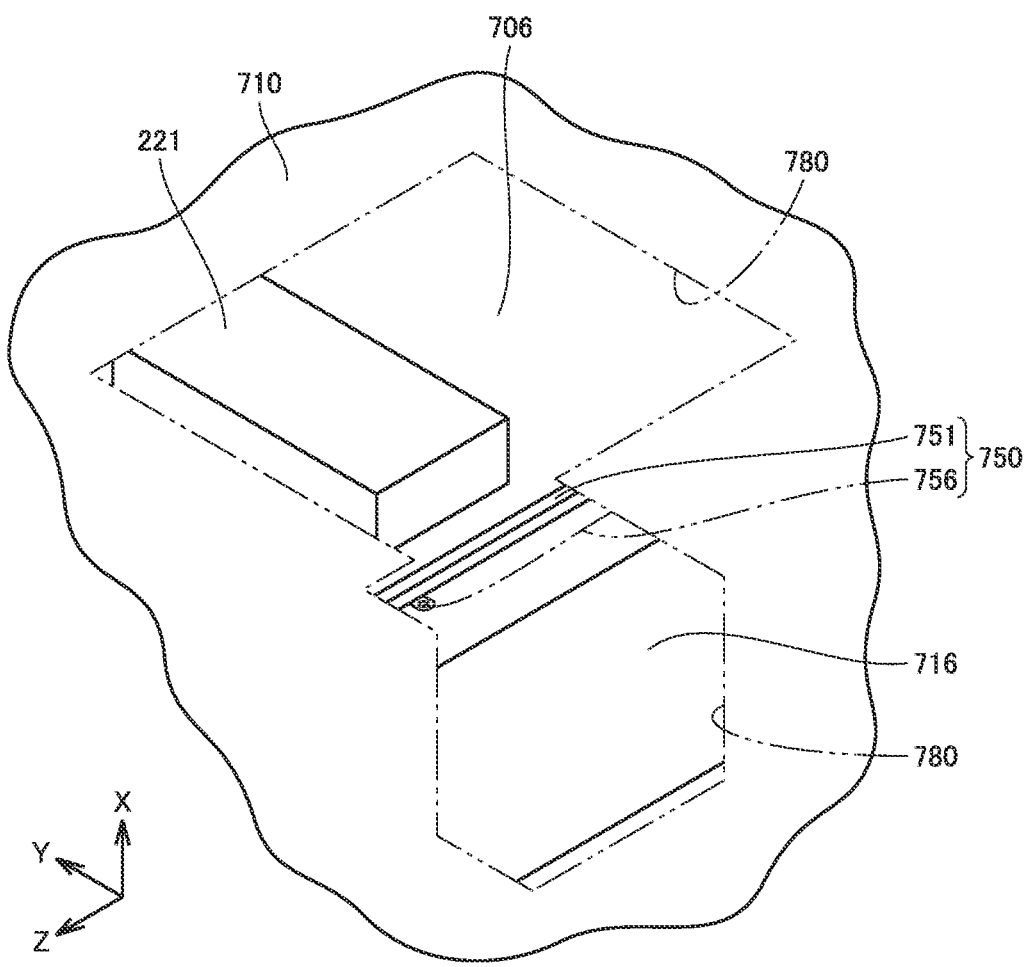
FIG. 16 is a perspective view illustrating a positional relationship among an opening that is generated when the lid is in the open state, the safety belt connection portion, and a line body support.

FIG. 16 is a perspective view illustrating a positional relationship among the opening that is generated when the lid is in the open state, the safety belt connection portion, and the line body support.

With reference to FIGS. 13 and 16, when lid 721B, lid 721C, lid 721H, and lid 721N are the open state, opening 780 is formed in external cover 710. Internal space 706 and the space outside internal space 706 communicate with each other through opening 780. Opening 780 opens in the +X-axis direction (upward) and the −Y-axis direction.

Safety belt connection portion 750 is exposed to the outside of internal space 706 through opening 780. Safety belt connection portion 750 is exposed to the outside of internal space 706 in a part of the length region of first beam 751 and rope 756 in the Z-axis direction. Safety belt connection portion 750 is opposite to an opening plane formed by opening 780 in the Y-axis direction and the X-axis direction.

First beam 751 extends in the Z-axis direction along the opening plane formed by opening 780. First beam 751 is disposed immediately below the opening plane formed by opening 780.

When lid 721B, lid 721C, lid 721H, and lid 721N are in the open state, line body support 221 is exposed to the outside of internal space 706 through opening 780. Line body support 221 is opposite to the opening plane formed by opening 780 in the X-axis direction. The space above line body support 221 is opened in the +X-axis direction (upward) through opening 780.

When lid 721B, lid 721C, lid 721H, and lid 721N are in the open state, footboard 716 is exposed to the outside of internal space 706 through opening 780. Footboard 716 is opposite to the opening plane formed by opening 780 in the X-axis direction. The space above footboard 716 is opened in the −Y-axis direction and the +X-axis direction (upward) through opening 780.

In top view, line body support 221 is located on the opposite side of footboard 716 across safety belt connection portion 750 (first beam 751 and rope 756).

With reference to FIGS. 9, 13, and 16, there may be a need for maintenance of line body support 221 including tension applying mechanism 335, coupling mechanism 380, first guide mechanism 370, second guide mechanism 360, and the like.

In this case, the worker moves line body support 221 in the Z-axis direction to position line body support 221 immediately below lid 721B and lid 721C. The worker stands at the top of ladder 714 through corridor 712 and ladder 714.

When revolving lid 721H about rotating axis 531 to remove lid 721N from external cover 710, the worker opens lid 721H and lid 721N. When sliding lid 721B in the +Z-axis direction to slide lid 721C in the −Z-axis direction, the worker opens lid 721B and lid 721C.

The worker hangs hooks 762 of safety belt 761 mounted on own body on the rope 756 of safety belt connection portion 750. The worker performs maintenance of line body support 221 through opening 780.

In the embodiment, lids 721B, 721C, 721H, 721N that can be opened and closed are provided in external cover 710, and safety belt connection portion 750 is provided at the position exposed to the outside of internal space 706 through opening 780 generated when lids 721B, 721C, 721H, 721N are opened. Thus, when opening lids 721B, 721C, 721H, 721N, the worker can hang hook 762 of safety belt 761 mounted on own body on rope 756 of safety belt connection portion 750. Accordingly, the workability can be improved when the worker uses safety belt 761.

In addition, safety belt connection portion 750 is disposed inside external cover 710 that forms the appearance of processing machine 100. Thus, safety belt connection portion 750 does not affect the maximum mechanical dimension (height) of processing machine 100, but processing machine 100 can be downsized.

In the embodiment, lid 721B and lid 721C are slidably supported, and lid 721H is revolvably supported. With such the configuration, lid 721B, lid 721C, and lid 721H can be easily opened and closed, so that the workability can be further improved when the worker uses safety belt 761.

Lid 721N is supported by first beam 751 of safety belt connection portion 750. According to such the configuration, first beam 751 is disposed immediately on the back side of lid 721N, so that the configuration in which safety belt connection portion 750 is exposed through opening 780 generated when lid 721N is opened can be easily obtained. In addition, first beam 751 supporting external cover 710 is shared by safety belt connection portion 750 connecting safety belts 761, so that the number of parts can be reduced.

First beam 751 extends in one direction along the opening plane formed by opening 780. Thus, first beam 751 can be prevented from largely closing the opening plane formed by opening 780. Accordingly, the worker can easily perform the maintenance of line body support 221 through opening 780.

In the embodiment, although the case where the maintenance of line body support 221 is performed with lids 721B, 721C, 721H, 721N of the plurality of lids 721 in the open state has been described, this is an example.

The maintenance target is not limited to line body support 221, but for example, may be automatic tool changer 141 or slide cover 351. Lid 721 excluding lids 721B, 721C, 721H is attached to the main body side of processing machine 100 such as first beam 751 and second beam 746 using bolts. Lid 721 excluding lids 721B, 721C, 721H can be removed from the main body side of processing machine 100 by loosening the bolts. The worker can provide the opening at an appropriate position by bringing at least one lid 721 of the plurality of lids 721 into the open state according to the position of the maintenance target.

When the structure of processing machine 100 of the embodiment of the present invention described above is summarized, processing machine 100 of the embodiment includes external cover 710 that forms the appearance of processing machine 100 and defines and forms internal space 706, and safety belt connection portion 750 that is disposed in internal space 706 and to which safety belt 761 can be connected. External cover 710 includes openable lid 721. Safety belt connection portion 750 is exposed to the outside of internal space 706 through the opening that is generated in external cover 710 when lid 721 is in the open state.

According to processing machine 100 of the embodiment of the present invention configured as described above, the workability can be improved when the worker uses safety belt 761, and processing machine 100 can be downsized.

In the embodiment, the case where the AM/SM hybrid processing machine is configured based on the combined processing machine having the turning function and the milling function has been described. However, the present invention is not limited to such the configuration, and for example, the AM/SM hybrid processing machine may be configured based on a machining center having the milling function. In addition, the present invention is not limited to the AM/SM hybrid processing machine, but may be applied to a lathe, a machining center, or a combined processing machine having a turning function and a milling function.

It should be considered that the disclosed embodiment is an example in all respects and not restrictive. The scope of the present invention is defined by not the description above, but the claims, and it is intended that all modifications within the meaning and scope of the claims and their equivalents are included in the present invention.

INDUSTRIAL APPLICABILITY

For example, the present invention is applied to an AM/SM hybrid processing machine, a lathe, a machining center, a combined processing machine, or the like.

REFERENCE SIGNS LIST

100: processing machine, 110: processing area, 111: first workpiece spindle, 116: second workpiece spindle, 121: tool spindle, 122: spindle end face, 123: side surface portion, 124: front surface portion, 131: additive-manufacturing head, 132: head body, 133: laser tool, 136: disk portion, 141: automatic tool changer, 143: lifting arm, 144: double arm, 151: bed, 152: first longitudinal frame, 153: second longitudinal frame, 154: first transverse frame, 155, 312: rail, 156: rack, 161: saddle, 162: cross slide, 163: ram, 171: tool magazine, 181: splash guard, 191: laser tool storage portion, 192: head storage portion, 210: line body, 211: flexible tube, 211*p*: one end, 211*q*: the other end, 221: line body support, 222: servomotor, 311: second transverse frame, 331: base, 332: pulley portion, 333: coil spring, 334: bracket, 335: tension applying mechanism, 336, 381: block, 341: material powder supply device, 342: laser oscillation device, 351: slide cover, 352: line body insertion hole, 360: second guide mechanism, 370: first guide mechanism, 372: slider, 380: coupling mechanism, 382: air cylinder, 501, 502, 503, 526, 541, 542, 543: rotation axis, 504, 505: turning axis, 531: revolving axis, 706: internal space, 710: external cover, 710*a*: front surface, 710*b*: rear surface, 710*c*: right side surface, 710*d*: left side surface, 710*e*: upper surface, 711: door, 712: stairway, 714: LADDER, 716: footboard, 721, 721A, 721B, 721C, 721D, 721E, 721F, 721G, 721H, 721I, 721J, 721K, 721L, 721M, 721N: lid, 726: second support, 727: hinge, 741: first column, 742: second column, 746: second beam, 750: safety belt connection portion, 751: first beam, 752: tab, 753: rope insertion hole, 756: rope, 761: safety belt, 762: hook, 770: first support, 771: first rail, 772: first groove, 773: second groove, 774: first rotation roller, 775: second rotation roller, 776: second rail, 777: third groove, 778: third rotation roller, 780: opening

The invention claimed is:

1. A processing machine comprising:
   an external cover that forms an appearance of the processing machine and defines and forms an internal space; and
   a safety belt connection portion that is disposed in the internal space and to which a safety belt is connectable, wherein
   the external cover includes an openable and closable lid,
   the safety belt connection portion is exposed to an outside of the internal space through an opening that is generated in the external cover when the lid is in an open state, and
   the lid is supported by the safety belt connection portion,
   the safety belt connection portion includes a frame portion extending in one direction along an opening plane formed by the opening,
   the safety belt connection portion further includes a rope routed along the frame portion.

2. The processing machine according to claim 1, wherein the lid is disposed on a ceiling portion of the processing machine.

3. The processing machine according to claim 1 further comprising a support that rotatably or slidably supports the lid,
   wherein the opening is generated in the external cover when the lid is revolved or slid.

4. The processing machine according to claim 1, wherein the external cover includes a plurality of the lids that is openable and closable independently of each other.

5. The processing machine according to claim 1, wherein the frame portion is made of a pipe member having a closed section.

6. A processing machine comprising:
   an external cover that forms an appearance of the processing machine and defines and forms an internal space; and
   a safety belt connection portion that is disposed in the internal space and to which a safety belt is connectable, wherein
   the external cover includes an openable and closable lid, and
   the safety belt connection portion is exposed to an outside of the internal space through an opening that is generated in the external cover when the lid is in an open state,
   the processing machine further comprises:
   an additive-manufacturing head that is disposed in a processing area, discharges material powder to a workpiece, and irradiates the workpiece with a laser beam;
   a line body that extends from the additive-manufacturing head, is drawn from an inside to an outside of the processing area, and supplies the material powder and the laser beam to the additive-manufacturing head; and
   a line body support that is provided outside the processing area to support the line body, and
   the line body support is exposed to the outside of the internal space through the opening that is generated in the external cover when the lid is in the open state.

7. The processing machine according to claim 6, wherein the lid is disposed on a ceiling portion of the processing machine.

8. The processing machine according to claim 6, further comprising a support that rotatably or slidably supports the lid,
   wherein the opening is generated in the external cover when the lid is revolved or slid.

9. The processing machine according to claim 6, wherein the external cover includes a plurality of the lids that is openable and closable independently of each other.

10. The processing machine according to claim 6, wherein the safety belt connection portion includes a frame portion extending in one direction along an opening plane formed by the opening.

11. The processing machine according to claim 10, wherein the safety belt connection portion further includes a rope routed along the frame portion.

12. The processing machine according to claim 10, wherein the frame portion is made of a pipe member having a closed section.

* * * * *